United States Patent [19]

Rice et al.

[11] Patent Number: 5,016,358
[45] Date of Patent: May 21, 1991

[54] GUIDE FENCE AND MITRE GUIDE ASSEMBLY FOR ROUTER MOUNTING TABLE

[76] Inventors: Verle L. Rice, Harrisonville, Mo. 64701; Richard A. Keener, Garden City, Mo. 64747

[21] Appl. No.: 393,141

[22] Filed: Aug. 14, 1989

Related U.S. Application Data

[62] Division of Ser. No. 190,894, May 6, 1988, Pat. No. 4,884,604.

[51] Int. Cl.⁵ .............................................. B27B 25/10
[52] U.S. Cl. ........................................ 33/569; 83/437; 83/421; 33/430; 33/465; 144/136 R
[58] Field of Search .................. 33/537, 538, 534, 638, 33/642, 573, 495–500, 568, 569, 570, 430, 465; 144/253 R, 253 G, 84; 83/438, 437

[56] References Cited

U.S. PATENT DOCUMENTS

| | | | |
|---|---|---|---|
| 2,696,854 | 12/1954 | Woodruff | 144/253 R X |
| 2,884,965 | 5/1959 | Stahl | 83/437 X |
| 4,259,887 | 4/1981 | Dean | 83/437 |
| 4,454,793 | 6/1984 | Strong | 83/437 X |
| 4,763,706 | 8/1988 | Rice et al. | 144/84 X |

Primary Examiner—Harry N. Haroian

[57] ABSTRACT

A combination simple and compound mitre gauge along with a precision split fence constitute the subject matter of the present invention. Both the mitre gauge and fence are intended to be utilized with power woodworking tools. The mitre gauge constitutes both a simple and compound gauge by utilizing an elongated member which slides in a groove on the supporting table and a suppport plate coupled with the member which is movable about a vertical axis and can be held in a given position by appropriate locking means. The support plate presents a vertical surface which mounts a guide that can be moved into one of two positions to vary the length of it. The guide may also be removed and a planar surface presenting shoe pivotally coupled with the support plate. The angle of the planar surface of the shoe may be varied and means is provided for locking the shoe in any given position. Thus, the planar work piece supporting surface of the mitre gauge is movable about both horizontal and vertical axes so as to accommodate any desired angle of contact between the work piece and the cutting tool. The guide fence of the invention employs two mirror image L-shaped brackets each of which has a vertical guide plate that presents a guide surface in perpendicular relationship to the supporting table and means presenting an aligning surface in spaced relationship to the guide surface. In this manner, one half of the fence may be squared followed by movement of the other half of the fence a desired distance and it may then be squared utilizing the two aligning surfaces which can be locked together.

3 Claims, 2 Drawing Sheets

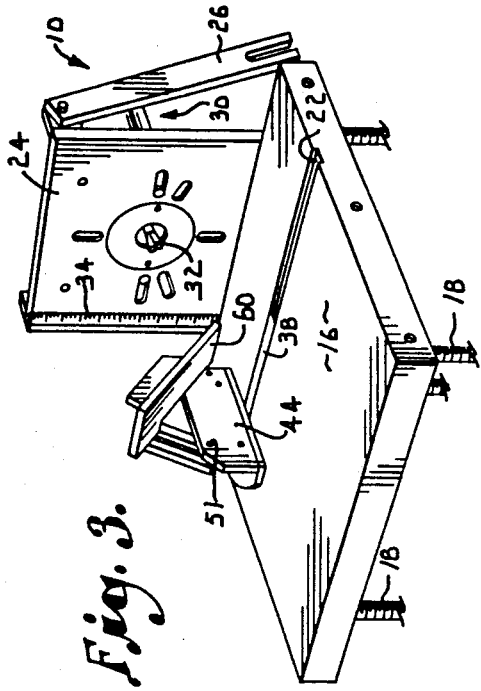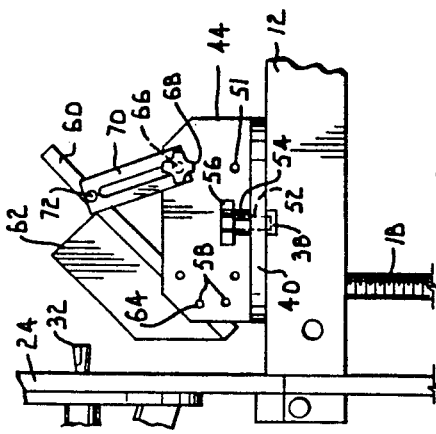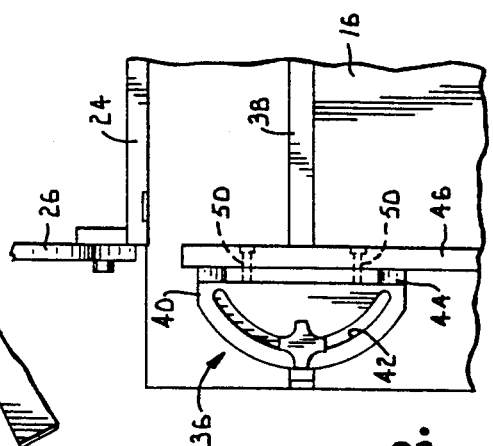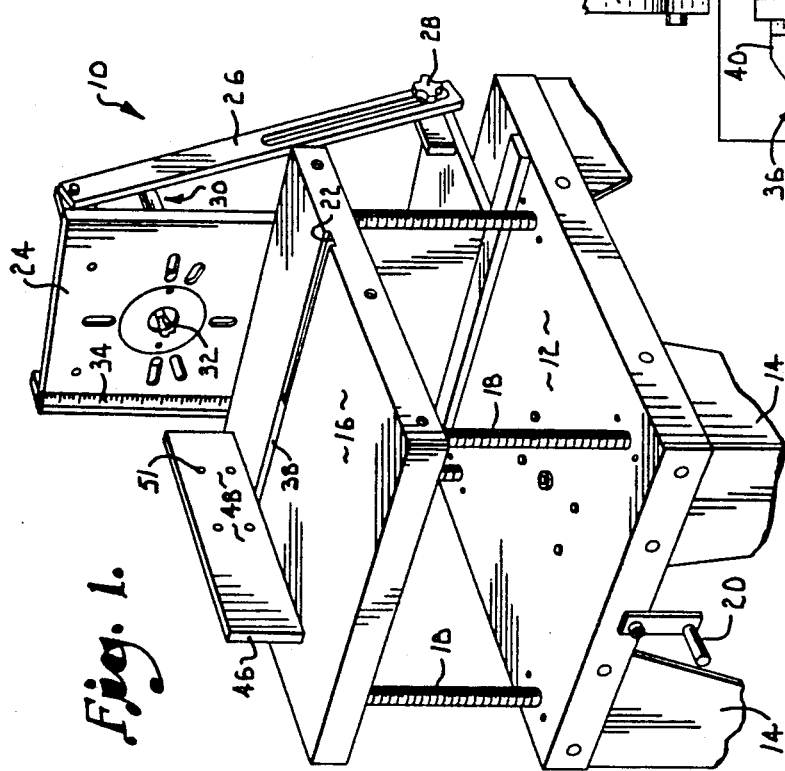

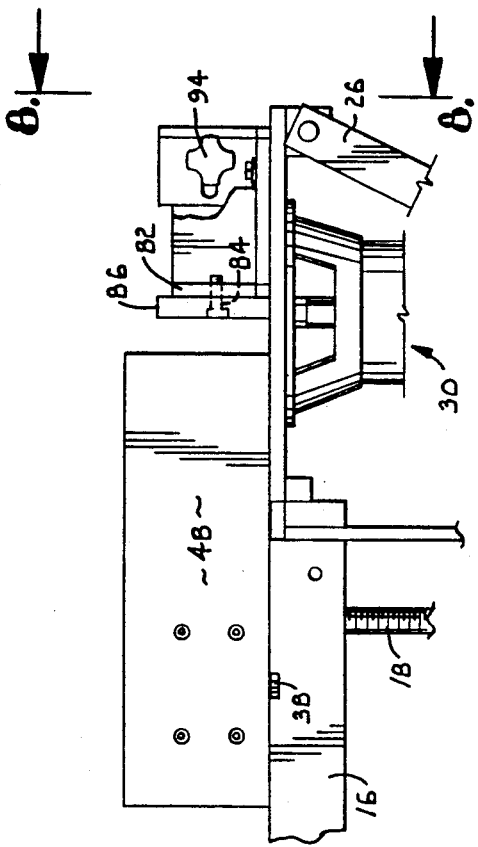
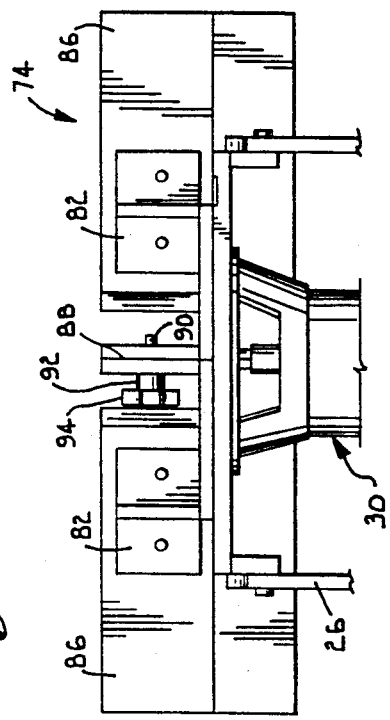
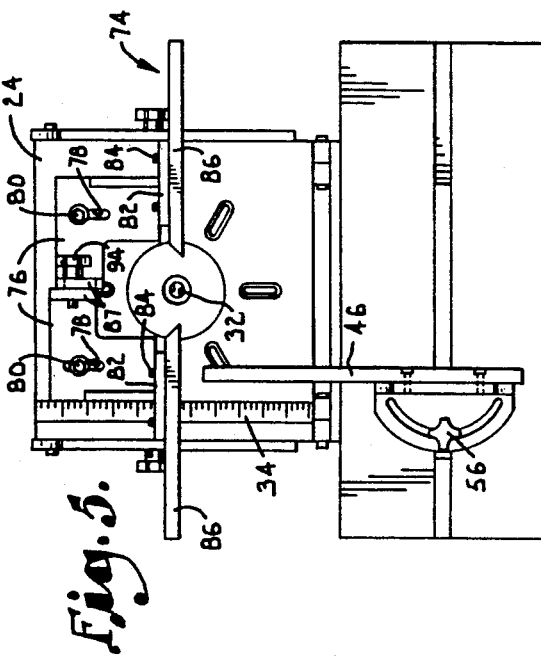
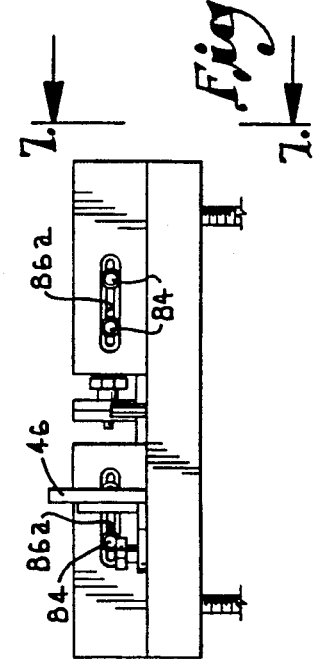

GUIDE FENCE AND MITRE GUIDE ASSEMBLY FOR ROUTER MOUNTING TABLE

This is a division of application Ser. No. 190,894, filed May 6, 1988 now U.S. Pat. No. 4,884,604.

FIELD OF THE INVENTION

The invention relates generally to woodworking equipment and, more particularly, to a mitre gauge and guide fence for utilization with a cutting tool such as a saw or router.

BACKGROUND OF THE INVENTION

It is well-known to employ mitre gauges and guide fences in conjunction with power woodworking tools.

A router mounting table is shown and described in allowed U.S. patent application Ser. No. 037,549, filed Apr. 13, 1987, now U.S. Pat. No. 4,763,706. Mitre gauges and guide fences are typically used with such tables. Table saws also utilize guide fences and mitre gauges to assure accurate cuts.

Mitre gauges of the prior art are generally classified as simple and compound. A simple mitre gauge comprises an elongated member which rides in a groove in the table and presents a vertical support plate that is movable about a vertical axis. A piece of wood is held against the support plate after it has been adjusted to the appropriate angle so as to assure an accurate cut at this angle. A compound mitre gauge of the prior art is a separate accessory requiring installation on the woodworking table after the simple mitre gauge has been removed. These compound mitre gauges normally include a number of movable arms and carriages for positioning a work piece to allow mitre cuts to be made at two different angles.

It is known in the art to employ split guide fences with woodworking tools so that the infeed and outfeed halves of the fence may be independently adjusted. This assures that the piece being worked will remain in contact with the fence on both the infeed and outfeed sides of the cutting tool. The constructions of the prior art have consisted of a long mounting bar which requires considerable effort to square before the two halves of the guide fence can be independently adjusted.

It is therefore a primary object of the present invention to provide a combination simple and compound mitre gauge which can be changed between its simple and compound operating modes by loosening a single screw.

Another objective of our invention is to provide a simple mitre gauge having a guide surface which may be moved alternately into one of two positions of varying length.

Another important objective of the invention is to provide a compound mitre gauge which may be adapted to different angles in two different planes.

It is also an object of this invention to provide a guide fence for a woodworking tool wherein the fence utilizes two independent mounting plates for the infeed and outfeed sections of the fence thereby facilitating alignment of the fence sections relative to the working tool.

Other objects of the invention will be made clear or will become apparent from the following description and claims wherein:

FIG. 1 is a perspective view of a router mounting table employing a simple mitre gauge according to the present invention.

FIG. 2 is a fragmentary top plan view showing the mitre gauge of FIG. 1;

FIG. 3 is a perspective view of the router mounting table of FIG. 1 with the mitre gauge converted to a compound gauge;

FIG. 4 is a fragmentary end elevational view of the compound mitre gauge shown in FIG. 3;

FIG. 5 is a top plan view of the guide fence for use with a woodworking tool according to the present invention;

FIG. 6 is a front elevational view of the fence shown in FIG. 5;

FIG. 7 is an end elevational view looking in the direction of arrows 7—7 of FIG. 6; and FIG. 8 is an elevational view looking in the direction of arrows 8—8 of FIG. 7.

Referring initially to FIG. 1, a router mounting table is designated generally by the numeral 10 and is constructed in accordance with the teachings of allowed U.S. patent application Ser. No. 037,549, filed Apr. 13, 1987, now U.S. Pat. No. 4,763,706. Table 10 includes a rigid horizontal platform 12 mounted on legs 14. Platform 12 supports a working table 16 which is mounted on threaded leg supports 18. Leg supports 18 are threadably received by rotatable sprockets (not shown) which are driven by a common chain drive train (not shown) that is movable by handle 20. Rotation of the handle 20 thus raises or lowers working table 16. Table 16 is provided with a channel or groove 22 for purposes to be made clear hereinafter. A pivotable router mounting plate 24 is hingedly mounted at one side of table 16 and is movable from a first position perpendicular to the latter table to a second position in planar alignment with the table. Slotted legs 26 which are coupled with plate 24 accommodate the afore described 90° movement. Threaded knob screws 28 are engageable with each leg 26 to lock plate 24 in any position over its range of movement.

A router designated generally by the numeral 30 is mounted on the back side (relative to platform 12) of plate 24 and has its working bit 32 projecting through an opening in the plate to the opposite side. Plate 24 is also provided with a ruler 34 along one side adjacent router bit 32.

Referring particularly to FIGS. 1 and 2, the mitre gauge of the present invention is designated generally by the numeral 36. Mitre gauge 36 includes an elongated bar member 38 which is sized to fit in and slide along groove 22.

Pivotally disposed on top of bar member 38 is a base plate 40 which has an arcuate slot 42 adjacent one side, with the center point defined by the arcuate slot 42 being the pivot point. Base plate 40 is rigid with a support plate 44 which projects upwardly at a 90° angle from the base plate. Support plate 44 rigidly mounts a wood block 46 which in turn presents a guide surface 48. Block 46, which serves as a guide board, is removably secured to support plate 44 by recessed set screws 50 (FIG. 2) which are received by threaded openings 51 in the vertical surface of plate 44.

Base plate 40 is coupled with bar member 38 by a threaded stud 52 which passes through slot 42 and into a threaded cavity in member 38. Stud 52 is rigid with a collar 54 which in turn is rigid with a knob 56 for turning the stud. Two vertically spaced openings 58 in support plate 44 are provided for purposes to be made clear hereinafter.

Referring particularly to FIGS. 3 and 4, wood block 46 has been removed from support plate 44 and a variable angle planar shoe 60 is mounted thereon. Projecting upwardly at a 90° angle to the planar surface of shoe 60 is a retaining rail 62 which is rigid with shoe 60. Projecting outwardly from one side of the shoe is a pin 64 which is received within one of the openings 58. Threadably received in one of the openings 51 is a threaded stud 66 which is rigid with knob 68. Stud 66 is received within the slotted portion of a slotted linkage 70 that is joined to shoe 60 by a pivot coupling 72.

Referring now to FIGS. 5-8 of the drawings, mounting plate 24 has been moved to its horizontal position in planar alignment with platform 12. A guide fence according to the present invention is designated generally by the numeral 74 and has been installed on router mounting plate 24.

Guide fence 74 comprises first and second L-shaped planar support plates 76 which are mirror images of each other. Each plate is provided with a slot 78 for receiving a bolt 80 which secures the plate to router mounting plate 24. A rigid guide plate 82 is fixed with plate 76 in perpendicular relationship to the latter at one end of the "L". Threaded screws 84 are received in openings in the guide plates 82 and mount wooden fence blocks 86. At the opposite end of each L-shaped plate 76 from guide plate 82 is a vertically extending planar member 87 which presents a planar aligning surface 88. Each of the members 87 is provided with a threaded opening which openings receive a threaded stud 90 (FIG. 8) that is rigid with a collar 92 and a knob 94.

When the simple mitre gauge 36 of the invention is utilized, bar member 38 is positioned in groove 22 and wood block 46 is installed on support plate 44 in one of two positions. In the first position shown in FIG. 1, block 46 has its longest side, relatively to groove 22, projecting to the left or away from the router bit 32. In this position, the board 46 extends across the planar surface of working table 16 and toward the working surface of router mounting plate 24 without extending across the latter. This permits work to be done on a work piece (not shown) with the angle of contact between the work piece and router bit 32 or other cutting means to be varied by moving base plate 40 relative to bar member 38. Once a desired angle is selected, knob 56 is tightened to hold the block 46 in a stationary position.

When router mounting plate 24 is moved to its horizontal position shown in FIG. 5 and it is desirable to utilize mitre gauge 36, screws 50 are loosened and wood block 46 is rotated 180° to the position shown in FIG. 5. In this position with the working surfaces of platform 12 and mounting plate 24 in planar alignment, the block 46 extends partially across both surfaces so as to guide the work piece into engagement with router bit 32 or other cutting tool at the desired angle.

When it is necessary to utilize a compound mitre gauge, board 46 is removed from support plate 44 by loosening screws 50. Planar shoe 60 is then mounted on plate 44 by inserting pin 64 in one of the two openings 58 and screwing stud 66 into one of the threaded openings 51 of plate 44 which previously received a screw 50. With this simple two step procedure (removing the board 46 and installing shoe 60), a compound mitre gauge is provided. The angle of the planar surface of shoe 60 is variable by loosening knob 68 and sliding linkage 70 relative to the knob and stud 66. Manifestly, further variations in the angle and vertical height of shoe 60 are possible by selecting lower opening 58 for insertion of pin 64. The working angle of the mitre gauge may still be varied by moving plate 44 relative to stud 52 which is received in bar member 38. Thus, the compound mitre gauge presented by the modified assembly of gauge 36 is movable about both horizontal and vertical axes to accommodate any desired angle for engagement of a work piece with bit 32 or other cutting tool.

Referring additionally to FIGS. 5 through 8, operation of guide fence 74 will now be described. By way of additional background, split guide fences are utilized in precision woodworking where a cut is to be made along the length of a work piece thereby reducing the thickness of the work piece by the depth of the cut. By employing a split guide fence, the work piece may be fed into the cutting head by holding the work piece firmly against the guide fence. The outfeed half of the guide fence is moved outwardly from the cutting head at a distance equal to the thickness of the cut being made so that the portion of the work piece having been cut and thus of a reduced thickness will continue to engage the outfeed half of the fence as the remainder of the board or other work piece continues to be cut. This precludes any "rotation" of the work piece about the cutting head which could alter the accuracy of the cut being made.

In utilizing guide fence 74, the outfeed half of the fence (the righthand side of FIG. 5) is first squared by aligning planar member 86 with the outermost point on bit 32 (relative to the edge of plate 24 which is furthest away from platform 12). Member 86 can be easily squared relative to the reference point on bit 32 by utilizing a carpenter's square or by measuring with a ruler. Once planar member 86 is squared, bolt 80 in the associated support plate is tightened so as to retain the squared position for the outfeed half of the fence. Utilizing ruler 34, the infeed half of the fence (the left-hand side of FIG. 5) is then "backed off" (or moved toward the side of plate 24 which is furthest away from platform 12) a distance equal to the thickness of the cut intended to be made in the work piece by bit 32. As soon as this distance is selected, knob 94 is tightened so as to force aligning surfaces 88 into tight engagement thus assuring that the second support plate 76 will also be square. Finally, after knob 94 is tightened, bolt 80 in the second support plate 76 is tightened thereby assuring that the second plate 76 will remain in its aligned position. Once both bolts 80 are tightened, and by virtue of the two plates 76 being locked together through aligning surfaces 88 and threaded stud 90, rotational movement of the guide fence 74 is precluded.

Positioning of fence 74 in the aforedescribed manner offers considerable time savings over prior art constructions where a single bar mounts both halves of the fence and accordingly the entire fence must be squared before one half can be moved relative to the other. From viewing FIG. 6, it will also be appreciated that slots 86a in members 86 accommodate lateral movement of the face members relative to bit 32 so that the open space between the two members may be varied so as to accommodate different size cutting tools such as bit 32.

It will be apparent from the foregoing that a mitre gauge and guide fence has been provided meeting the aims and objectives of the present invention. It will be appreciated that various modifications and adaptations of the devices herein disclosed can be made without departing from the scope of the invention which is intended to be limited only by the appended claims.

We claim:

1. A mitre gauge for use with a power woodworking tool mounted on a table having a stationary horizontal surface and a second surface adjacent said stationary surface, said second surface being movable between a first position in planar alignment with said stationary surface and a second position perpendicular to said stationary surface, said stationary surface having a groove extending the length thereof, said mitre gauge comprising:

an elongated member adapted to be slidably received within said groove;

a support plate pivotably mounted on said member for rotation about a vertical axis, said support plate including at least two support holes extending therein, said support holes having relative positions with respect to each other;

a guide surface member having first and second ends and at least two guide holes extending therein, said guide holes being closer to said first end than to said second end and having relative positions with respect to each other which allow respective ones of said support holes and said guide holes to be substantially aligned in first and second guide positions of said guide surface member, said first guide position being defined by said guide surface member extending perpendicular to and across only said stationary surface, such that said second surface of said table may be in said second position, and second guide position being defined by said guide surface member extending perpendicular to and across both said stationary surface and said second surface of said table, when said second surface of said table is in said first position, and;

means for releasably fixing said guide surface member to said support plate with said respective ones of said support holes maintained in substantial alignment, whereby said guide surface member may be selectively fixed to said support plate in either of said guide positions.

2. A mitre gauge as set forth in claim 1, wherein is included means for holding said support plate against pivotal movement about said vertical axis.

3. A mitre gauge as set forth in claim 2, wherein said support holes are threaded and wherein said means for releasably fixing comprises at least two bolts insertable through said guide holes and threadably engagable with said support holes.

* * * * *